United States Patent
Kim et al.

(10) Patent No.: US 9,418,429 B2
(45) Date of Patent: Aug. 16, 2016

(54) METHOD FOR RECOGNIZING OBJECT USING COVARIANCE DESCRIPTOR AND APPARATUS THEREOF

(71) Applicant: POSTECH ACADEMY—INDUSTRY FOUNDATION, Gyeongbuk (KR)

(72) Inventors: Dai Jin Kim, Gyeongsangbuk-do (KR); Jae Sik Yun, Gyeongsangnam-do (KR); In Su Kim, Gyeonggi-do (KR)

(73) Assignee: POSTECH ACADEMY—INDUSTRY FOUNDATION, Gyeongbuk (KR)

( * ) Notice: Subject to any disclaimer, the term of this patent is extended or adjusted under 35 U.S.C. 154(b) by 76 days.

(21) Appl. No.: 14/450,166

(22) Filed: Aug. 1, 2014

(65) Prior Publication Data

US 2015/0036938 A1    Feb. 5, 2015

(30) Foreign Application Priority Data

Aug. 2, 2013   (KR) .................. 10-2013-0091914

(51) Int. Cl.
*G06T 7/00* (2006.01)
*G06K 9/46* (2006.01)

(52) U.S. Cl.
CPC ............ *G06T 7/0044* (2013.01); *G06K 9/4671* (2013.01); *G06T 2207/20016* (2013.01); *G06T 2207/20076* (2013.01)

(58) Field of Classification Search
CPC ............ G06K 9/00281; G06K 9/4671; G06K 9/6211; G06K 9/4604; G06K 2009/4666; G06K 9/0061; G06K 9/46; G06K 9/4676; G06K 2009/6213; G06K 9/42; G06K 2209/21; G06K 9/00268; G06K 9/00523; G06K 9/6212; G06K 9/6261
USPC ........................................................ 382/201
See application file for complete search history.

(56) References Cited

U.S. PATENT DOCUMENTS 8,666,195 B1 * 3/2014 Mierle ................. G06K 9/6203
                                                 359/24
2005/0047656 A1 * 3/2005 Luo ...................... G06K 9/0061
                                                 382/167

(Continued)

FOREIGN PATENT DOCUMENTS

JP    2013513168 A    4/2013
KR    2009-0074690 A  7/2009

(Continued)

OTHER PUBLICATIONS

Tuzel, O., Porikli, F., and Meer, P; "Region Covariance: A Fast Descriptor for Detection and Classification." Proceedings of the 9th European conference on Computer Vision—vol. Part II, May 7, 2006 (12 pages).

(Continued)

*Primary Examiner* — Stephen R Koziol
*Assistant Examiner* — Shaghayegh Azima
(74) *Attorney, Agent, or Firm* — Osha Liang LLP

(57) ABSTRACT

Disclosed are object recognizing method and apparatus. The method may comprise extracting a feature point of an object to be recognized in an input image; generating a plurality of feature images by extracting orientation information of a region adjacent to the feature point and normalizing the region based in the orientation information; deriving a covariance descriptor based on the feature images; and recognizing the object in the input image by comparing the covariance descriptor with a reference covariance descriptor stored in advance. Thus, the object can be recognized fast and robustly to changes on the size of the input image, rotations of the input image, and illumination, whereby the recognition performance can be enhanced.

10 Claims, 7 Drawing Sheets

(56) References Cited

U.S. PATENT DOCUMENTS

| | | | |
|---|---|---|---|
| 2009/0238460 A1 | 9/2009 | Funayama et al. | |
| 2010/0021018 A1* | 1/2010 | Lee | G06K 9/00281 382/118 |
| 2010/0066822 A1* | 3/2010 | Steinberg | G06K 9/00208 348/77 |
| 2011/0052003 A1* | 3/2011 | Cobb | G06K 9/00771 382/103 |
| 2011/0255781 A1* | 10/2011 | Hamsici | G06K 9/4671 382/170 |
| 2012/0063673 A1 | 3/2012 | Hwang et al. | |
| 2013/0202200 A1* | 8/2013 | Ribnick | G06K 9/6221 382/160 |
| 2013/0308860 A1* | 11/2013 | Mainali | G06K 9/4671 382/170 |
| 2014/0050411 A1* | 2/2014 | Lee | G06K 9/4671 382/201 |
| 2014/0301647 A1* | 10/2014 | Mase | G06K 9/4671 382/195 |

FOREIGN PATENT DOCUMENTS

| | | |
|---|---|---|
| KR | 2012-0026232 A | 3/2012 |
| KR | 2013-0019430 A | 2/2013 |
| WO | 2011069023 A2 | 6/2011 |

OTHER PUBLICATIONS

Lowe, D.G; "Distinctive Image Features from Scale-Invariant Keypoints," International Journal of Computer Vision, vol. 60 Issue 2, Nov. 2004 (28 pages).

Rublee, E., Rabaud, V., Konolige, K., Bradski, G; "ORB: an efficient alternative to SIFT or SURF," Proceedings of the 2011 International Conference on Computer Vision, Nov. 6, 2011 (8 pages).

Bay, H., Tuytelaars, T., and Van Gool, L; "SURF: Speeded Up Robust Features," Proceedings of the ninth European Conference on Computer Vision, May 2006 (14 pages).

* cited by examiner

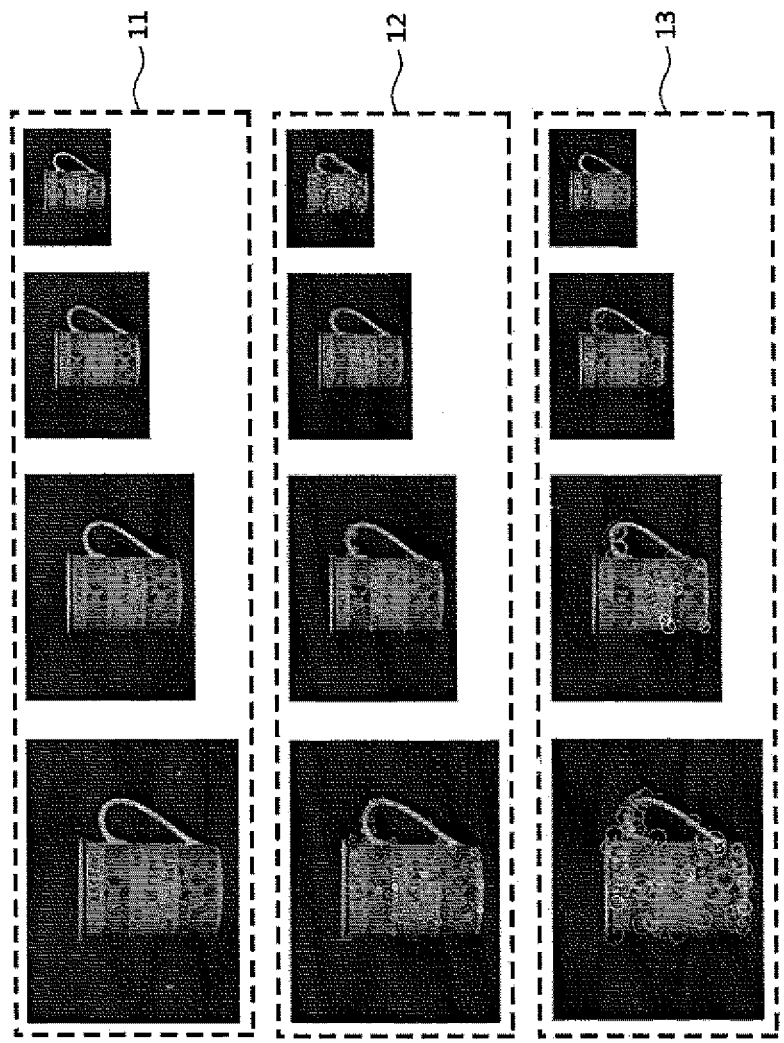

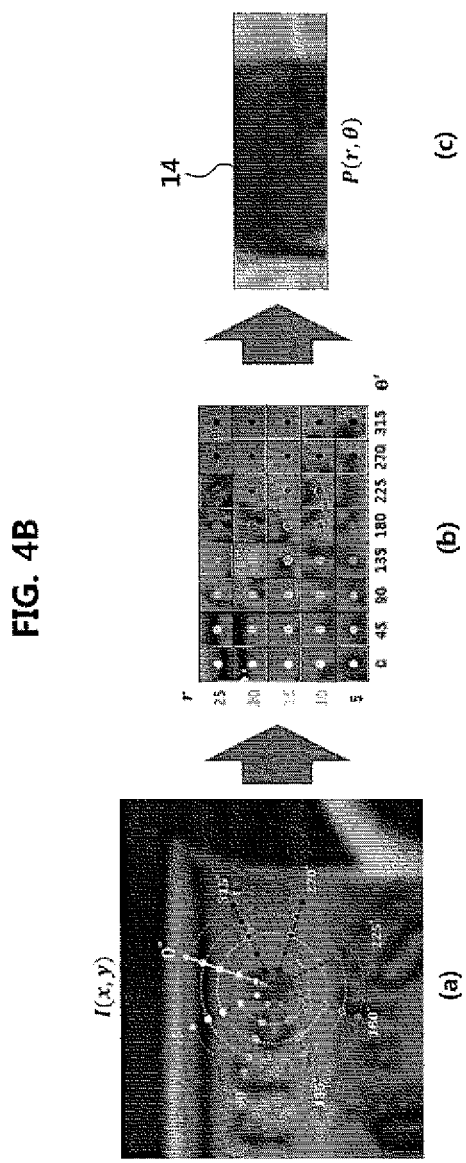

FIG. 6
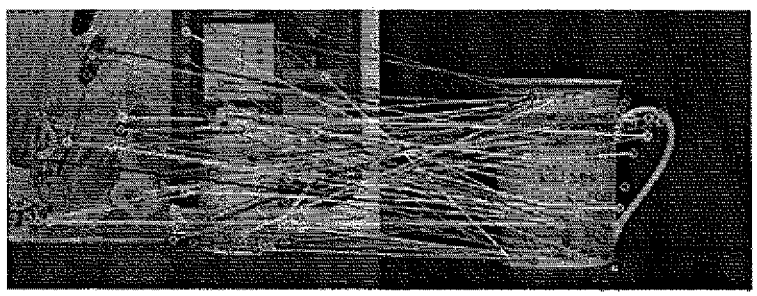
(a)
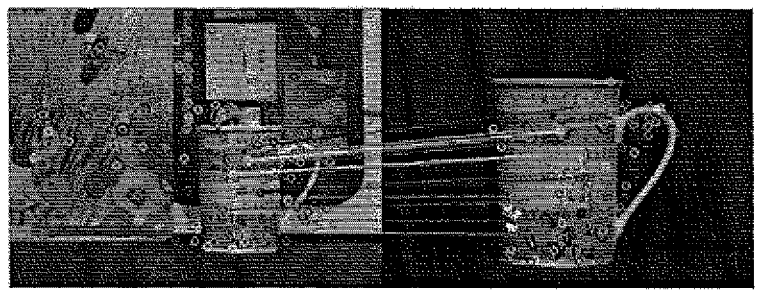
(b)
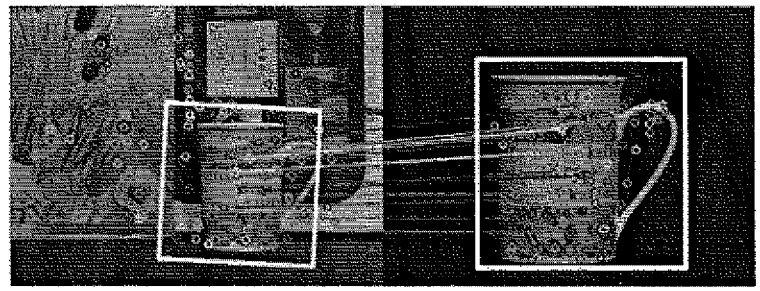
(c)

METHOD FOR RECOGNIZING OBJECT USING COVARIANCE DESCRIPTOR AND APPARATUS THEREOF

CLAIM FOR PRIORITY

This application claims priorities to Korean Patent Application No. 10-2013-0091914 filed on Aug. 2, 2013 in the Korean Intellectual Property Office (KIPO), the entire contents of which are hereby incorporated by references.

BACKGROUND

1. Technical Field

Example embodiments of the present invention relate to a technique for recognizing objects in a computer vision technology domain, and more specifically to an apparatus and method for recognizing objects in input image by deriving a covariance descriptor.

2. Related Art

A computer vision is an artificial intelligence technology domain in which a visual recognition ability among human five senses is implemented in an information processing apparatus.

Especially, an object recognition technique is being focused upon among various computer vision technologies since it can be applied to various application domains such as an intelligent robot, an augmented reality, a virtual reality, a three-dimensional structure formation, and a security technology based on face recognition.

However, since images captured in the information processing apparatus may be affected by various environmental factors such as their sizes, illuminations, obstacles, rotations, etc., it may have numerous difficulties to recognize objects in the images robustly.

Thus, conventional feature point extraction methods such as Scale Invariant Feature Transform (SIFT), Speeded Up Robust Features (SURF), and Oriented FAST and Rotated BRIEF (ORB) have been used for recognizing objects in images.

The SIFT is a method for extracting feature points which can be applied to an image processing system such as a surveillance camera or an autonomous navigation system. In the SIFT, objects can be recognized by deriving a high-order descriptor from feature points of the objects.

Also, the SURF is a method for extracting feature points which can be applied to an image processing system such as an object tracking system or a panorama image generating system. In the SURF, objects can be recognized by generating an integral image to which pixel values from an input image are summed and deriving feature points and a high-order descriptor according to each scale of the integral image.

Although the techniques SIFT and SURF have advantages that they are robust to image (or, object) size, illumination, and changes of image due to rotations, they have disadvantages that complex computation is required for implementing their algorithm, and computational speed may significantly degrade as the number of feature points increases. Also, it is difficult that the techniques are used for real-time processing in a mobile communication terminal having a low computational ability or a mobile environment with a limited power supply.

Therefore, the ORB technique has been proposed. In the ORB, in order to recognize objects, feature points are extracted by FAST or BRIEF algorithm, and a binary descriptor is generated by them.

The ORB technique enhances a speed of recognizing objects in an input image as compared to the SIFT and SURF which use the high-order descriptor. However, it has a problem of a low object recognition rate.

SUMMARY

Accordingly, example embodiments of the present invention are provided to substantially obviate one or more problems due to limitations and disadvantages of the related art.

Example embodiments of the present invention provide an object recognizing method which can recognize an object fast and robustly to changes such as changes of image size, rotational change of the image, and illumination change by extracting feature points for corners of the object from the image.

Example embodiments of the present invention also provide an object recognizing apparatus which can enhance object recognition performances by deriving a covariance matrix based on orientation information of regions adjacent to the feature points and deriving a covariance descriptor based on the covariance matrix.

In some example embodiments, a method for recognizing objects, performed in an information processing apparatus which can perform digital signal processing, may comprise extracting a feature point of an object to be recognized in an input image; generating a plurality of feature images by extracting orientation information of a region adjacent to the feature point and normalizing the region based on the orientation information; deriving a covariance descriptor based on the feature images; and recognizing the object in the input image by comparing the covariance descriptor with a reference covariance descriptor stored in advance.

Here, the extracting the feature point of the object to be recognized may include downscaling the input image into multiple downscaled images; and extracting the feature point in corners of the object in the multiple downscaled images.

Also, the generating the plurality of feature images may include generating a feature point region by deriving orientation information of the region adjacent to the feature point; generating a patch image by sampling values of pixels located within the feature point region and normalizing the feature point region; and generating the plurality of feature images based on the patch image.

Also, the deriving the covariance descriptor may include deriving a covariance matrix based on pixels located at same coordinate in the plurality of feature images; and converting the covariance matrix into a vector in Euclidean space.

Also, the covariance matrix may represent relationship between the pixels located at same coordinate in the plurality of feature images about characteristic including at least one of orientation of the object, color of the object, and brightness of the object.

Here, the recognizing the object in the input image may include deriving an inlier matched pair by comparing the covariance descriptor with at least one reference covariance descriptor stored in advance; and recognizing the object in the input image by estimating a homography of the object based on the inlier matched pair.

Here, the at least one reference covariance descriptor may be derived from a plurality of reference images including the object, and stored in advance.

In other example embodiments, an apparatus for recognizing objects from an input image, which is equipped in an information processing apparatus capable of performing digital signal processing, may comprise a feature point extracting part extracting a feature point of an object to be recognized in an input image; a feature image generating part generating a plurality of feature images by extracting orientation information of a region adjacent to the feature point and normalizing the region based on the orientation information; a descriptor deriving part deriving a covariance descriptor based on the feature images; and an object recognizing part recognizing the object in the input image by comparing the covariance descriptor with a reference covariance descriptor stored in advance.

Here, the feature point extracting part may downscale the input image into multiple downscaled images and extract the feature point in corners of the object in the multiple downscaled images.

Also, the feature image generating part may include a region generating module generating a feature point region by deriving orientation information of the region adjacent to the feature point.

Also, the feature image generating part may include an image generating module generating a patch image by sampling values of pixels located within the feature point region and normalizing the feature point region and generating the plurality of feature images based on the patch image.

Here, the descriptor deriving part may generate the covariance descriptor by deriving a covariance matrix based on pixels located at same coordinate in the plurality of feature images and converting the covariance matrix into a vector in Euclidean space.

Also, the covariance matrix may represent relationship between the pixels located at same coordinate in the plurality of feature images about characteristic including at least one of orientation of the object, color of the object, and brightness of the object.

Here, the object recognizing part may derive an inlier matched pair by comparing the covariance descriptor with at least one reference covariance descriptor stored in advance, and recognize the object in the input image by estimating a homography of the object based on the inlier matched pair.

Here, the apparatus may further comprise a descriptor data base storing the at least one reference covariance descriptor derived from a plurality of reference images including the object.

BRIEF DESCRIPTION OF DRAWINGS

Example embodiments of the present invention will become more apparent by describing in detail example embodiments of the present invention with reference to the accompanying drawings, in which:

FIG. 3 is a conceptual diagram to illustrate generation of feature points and feature point regions according to an example embodiment of the present invention;

FIGS. 4A and 4B are conceptual diagrams to explain generation of patch images according to an example embodiment of the present invention;

FIG. 6 is a conceptual chart to explain an object recognizing method according to an example embodiment of the present invention.

DESCRIPTION OF EXAMPLE EMBODIMENTS

Figure 1:
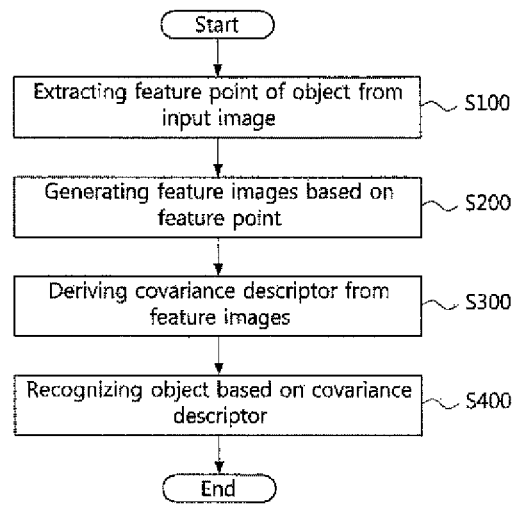
FIG. 1 is a flow chart to explain an object recognizing method according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferable example embodiments according to the present invention will be explained in detail by referring to accompanied figures.

FIG. 1 is a flow chart to explain an object recognizing method according to an example embodiment of the present invention. Also, FIG. 3 is a conceptual diagram to illustrate generation of feature points and feature point regions according to an example embodiment of the present invention.

Referring to FIG. 1, an object recognizing method may comprise a step S100 of extracting feature points of at least one object to be recognized from an input image; a step S200 of generating a feature image; a step S300 of deriving a covariance descriptor; and a step S400 of recognizing the at least one object from the input image.

Here, the object recognizing method may be performed in a user terminal.

The user terminal may be an information processing apparatus having at least one sensor to which the input image is inputted and a digital signal processing (DSP) unit for processing the input image, such as a smart phone, a tablet PC, a desktop computer, or a laptop computer. However, the user terminal may not be restricted to a specific device.

The input image is inputted to the at least one sensor equipped in the information processing apparatus, and the feature points of the at least one object to be recognized may be extracted from the input image (S100).

Referring to FIGS. 1 and 3, in order to extract the feature points about the at least one object, multiple downscaled images 11 can be generated by downscaling the input image into multiple downscaled images 11 with a predetermined downscale ratio. Here, the purpose of generating the downscaled multiple images 11 is for extracting feature points for the at least one object regardless of size of the input image.

Accordingly, as shown in a dotted line box indicated by a reference number 12 of FIG. 3, feature points about corners of the at least one object existing in the input image can be extracted by applying a FAST corner detection algorithm based on the FAST algorithm to the multiple downscaled images 11.

Here, the reason of extracting the feature points about corners of the at least one object is that characteristics of the corners of the objects may not change according to size of the image, illumination, and rotation of the image.

Also, the use of the FAST corner detection algorithm may derive candidates of the corners of the at least one object from the input image, and determine the feature points about the corners of the at least one object fast and stably based on differences between brightness values of the derived candidates of the corners.

Here, the FAST corner detection algorithm based on the FAST algorithm is used for extracting the feature points of the corners of the at least one object. However, various algorithms or detecting techniques may be used for extracting the feature points of the at least one object in the image without restricting to the FAST corner detection algorithm.

If the feature points of the at least one object are extracted from the input image, a plurality feature images may be generated by deriving orientation information of regions adjacent to the extracted feature points and normalizing the orientation information (S200).

In order to generate the feature images, feature point regions may be generated by deriving the orientation information of the regions adjacent to the feature points for the corners of the at least one object in the input image.

For example, the feature point regions may be represented as a specific orientation by estimating orientation information such as a main orientation and a rotation angle based on intensity values or brightness values of the feature points of the at least one object.

Therefore, the feature point regions may be normalized by sampling values of a plurality of pixels located within the generated feature point regions, and then patch images 14 (will be explained referring to FIG. 4A and FIG. 4B) may be generated.

Here, the patch image 14 may be generated by sampling orientations of values of multiple pixels located within a feature point region 13 among a plurality of feature point regions generated based on the feature points extracted from the input image and performing normalization on rotational changes of the feature points.

A plurality of feature images 13 which can explain the feature point regions may be generated based on the generated patch images 14, and a covariance descriptor may be derived based on the generated feature images 13 (S300).

Specifically, the covariance descriptor may be derived by deriving a covariance matrix based on pixels located at the same coordinates of the multiple feature images 13 and converting the derived covariance matrix into vectors in Euclidean space.

Here, since the covariance matrix exists in Remannian geometry space, immanent distance between the covariance matrixes should be calculated for the matching using distances between feature points.

However, since much computation time is needed for calculating immanent distance between the covariance matrixes, the covariance matrix in Remannian geometry space may be converted into vectors in Euclidean space by using a metric embedding technique so as to derive the covariance descriptor.

Thus, the derived covariance descriptor may represent relationship between pixel values located within the feature point region of the multiple feature images. In other words, the relationship between pixel values located within the feature point region may be represented by including at least one of orientation, color, and brightness of the corners of the at least one object in the input image.

The at least one object in the input image may be recognized based on the derived covariance descriptor (S400).

Specifically, the at least one object can be recognized from the input image by deriving inlier matched pair based on comparison between the covariance descriptor on the at least one object to be recognized and reference covariance descriptors stored in advance and estimating homography of the at least one object to be recognized based on the inlier matched pair.

Here, the reference covariance descriptors may be stored in advance by deriving covariance descriptors on objects from a plurality of reference images in which the object to be recognized is included.

For example, the matching between the derived covariance descriptor and the reference covariance descriptors may be performed by using a k-nearest neighbor distance ratio. Here, the matching may mean a matching between objects existing in different images.

That is, the inlier matched pair may be estimated based on Random Sample Consensus (RANSAC) algorithm which estimates a statistical parameter in order to estimate relationship between covariance descriptors.

Here, the inlier matched pair means information on covariance descriptors matched in a covariance descriptor matching procedure performed for recognizing objects existing in different images. However, it is not restricted to the above meaning.

At this time, if the number of the inlier matched pairs is greater than a predetermined number, objects existing in different images may be recognized as the same object. Also, the object can be recognized by estimating a homography which can represent a pose of the object based on the inlier matched pairs.

Figure 2:
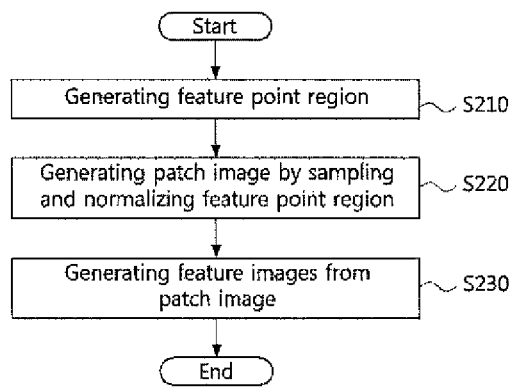
FIG. 2 is a flow chart to explain a method for generating feature images according to an example embodiment of the present invention.

FIG. 2 is a flow chart to explain a method for generating feature images according to an example embodiment of the present invention.

Figure 4A:
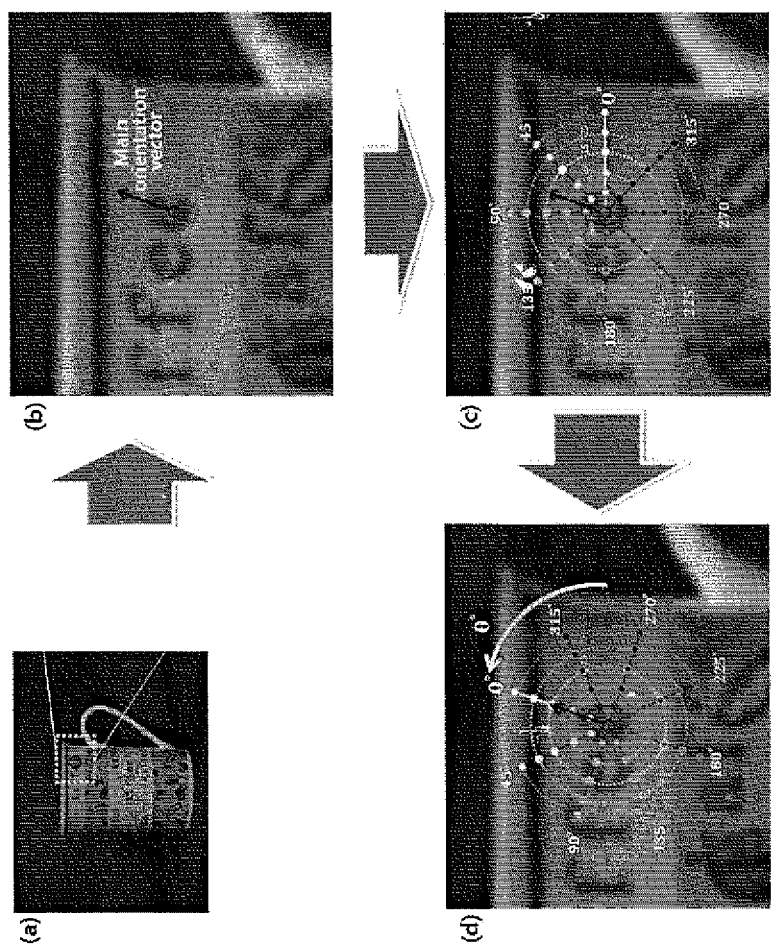
Figure 5:
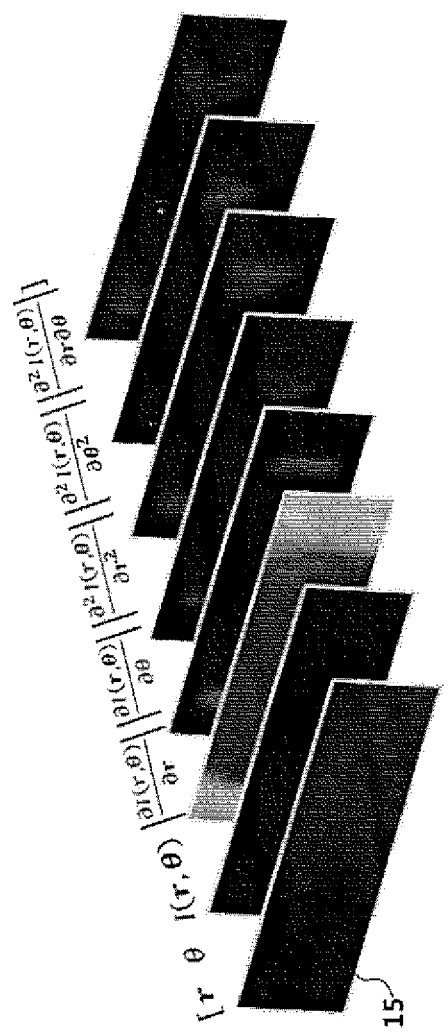
FIG. 5 is a conceptual diagram to illustrate feature images according to an example embodiment of the present invention.

Also, FIGS. 4A and 4B are conceptual diagrams to explain generation of patch images according to an example embodiment of the present invention, and FIG. 5 is a conceptual diagram to illustrate feature images according to an example embodiment of the present invention.

Referring to FIGS. 2 to 5, a method for generating feature images 15 may comprise a step S210 of generating feature point regions (as indicated by reference number 13 of FIG. 3); a step S220 of generating patch images 14 based on the feature point regions; and a step S230 of generating a plurality of feature images 15 from the patch images 14.

Specifically, as shown in FIG. 3, the feature point regions may be generated by extracting feature points about corners of the at least one object from multiple downscaled images 11 into which the input image is converted with a predetermined downscale ratio (S210).

Here, as described above, the purpose of generating the multiple downscaled images 11 is to extract feature points for the at least one object regardless of size of the image.

The feature points about corners of the at least one object can be extracted by using a FAST corner detection algorithm based on the FAST algorithm. Here, the use of the FAST corner detection algorithm may derive candidates of the corners of the at least object from the input image, and determine the feature points about the corners of the at least one object fast and stably based on differences between brightness values of the derived candidates of the corners.

The feature point regions may be generated by deriving the orientation information of the areas adjacent to the extracted feature points of the corners of the at least one object in the input image (S210).

[Equation 1]

$$m_{p,q} = \sum_{x}^{w} \sum_{y}^{h} (x-x_c)^p (y-y_c)^q I(x,y) \quad (1)$$

$$\bar{x} = \frac{m_{1,0}}{m_{0,0}}, \quad \bar{y} = \frac{m_{0,1}}{m_{0,0}} \quad (2)$$

$$\tan^{-1}\left(\frac{\bar{y}}{\bar{x}}\right) = \theta° \quad (3)$$

Referring to the above equation 1 and FIG. 4A, the feature point regions may be represented as a specific angle θ by calculating orientation information such as a main orientation vector and a rotation angle by using brightness and intensity values represented in the feature points about the corners of the at least one object.

The orientation information such as the main orientation vector and the rotation angle may be derived based on an intensity centroid calculated by using a central moment.

Here, the central moment may be derived by using (1) of the equation 1. Here, (x,y) may represent a coordinate of a pixel constituting the feature points of the object in a 2-dimensional image, and I(x,y) may represent an intensity value of the pixel located in the corresponding coordinate. Also, $x_c$ and $x_y$ may mean a center of the feature points or feature point regions.

Accordingly, the derived centroid may be represented as (2) of the equation 1. For example, if all of intensity values I(x,y) in the feature point region are 1, the centroid may be always a center position.

Also, since the derived centroid means a main orientation vector for the center position of the feature point region, the main orientation vector may be represented as the specific orientation θ by using (3) of the equation 1.

Referring to FIG. 4B, the patch image 14 may be generated by sampling the feature points or pixel values located within the feature point region and normalizing them (S220).

For example, as shown in FIG. 4A, an arbitrary feature point may be selected in the 2-dimensional image (indicated by (a) in FIG. 4A), and a region adjacent to the selected feature point may be enlarged (indicated by (b) in FIG. 4A). Here, the patch image 14 may be generated by forming a pattern as concentric circles by using the main orientation vector derived based on the equation 1 and normalizing the region by 0.

Also, as shown in FIG. 4B, the patch image may be generated by performing sampling with a reference axis of the main orientation vector (indicated by (a) in FIG. 4B).

$$x = x_c + r_i \cdot \cos(\theta_j' + \theta)$$

$$y = y_c + r_i \cdot \sin(\theta_j' + \theta)$$

$$P(r_i, \theta_j') = I(x,y) \quad \text{[Equation 2]}$$

Referring to the equation 2, the patch image P(r, θ) may be generated by sampling pixel values located in a concentric circle having a radius r and a rotation angle (θ'+θ) in reference to the feature point for the corner of the object, and inputting intensity values I(x,y) in the corresponding positions to an image P($r_i$, $\theta_j'$) in a polar coordinate system.

Here, (x,y) may represent position coordinate of the feature points or the sampled pixels in the 2-dimensinal image, and $x_c$ and $y_c$ may represent a center position of feature points in a sampled concentric circle.

Also, θ may represent a specific orientation derived from the center moment of the equation 1, and $\theta_j'$ may mean an angle of j-th sampled pixel, and $r_i$ means a radius of i-th concentric circle.

Accordingly, feature images 15 which describe the feature point regions may be generated from the rotation-normalized patch image 14.

For example, the multiple feature images 15 may be generated by using the intensity values I(r, θ) of the patch image 14 represented as (r, θ), a first-order differentiated value to an orientation direction r, a second-order differentiated value to the orientation r, a first-order differentiated value to the orientation θ, a second-order differentiated value to the orientation θ, and a first-order differentiated value to the direction (r, θ) for the I(r, θ).

FIG. 6 is a conceptual chart to explain an object recognizing method according to an example embodiment of the present invention.

Referring to FIG. 6, an object can be recognized from an input image based on a covariance descriptor. Here, the covariance descriptor may be derived by extracting a covariance matrix from feature images.

For example, feature images may be defined as {$v_1, v_2, v_3, v_4, v_5, v_6, v_7, v_8$}, and each feature vector for each feature image may be defined as the following equation 3.

[Equation 3]

$$V(x,y) = \begin{bmatrix} v_1(x,y) \\ v_2(x,y) \\ v_3(x,y) \\ v_4(x,y) \\ v_5(x,y) \\ v_6(x,y) \\ v_7(x,y) \\ v_8(x,y) \end{bmatrix}, 0 \leq x < w, 0 \leq y < h$$

Here, $v_i(x,y)$ may mean an intensity value of a pixel located in (x,y) of i-th feature image, and w may mean a width of each feature image, and h may mean a height of each feature image.

The covariance matrix may be derived by using the following equation 4 based on the feature vectors defined in the equation 3.

[Equation 4]

$$C_{d \times d} = \begin{bmatrix} COV(1,1) & COV(1,2) & \ldots & COV(1,d) \\ COV(2,1) & COV(2,2) & \ldots & COV(2,d) \\ COV(3,1) & COV(3,2) & \ldots & COV(3,d) \\ & & \vdots & \\ COV(d,1) & COV(d,2) & \ldots & COV(d,d) \end{bmatrix} \quad (1)$$

$$COV(i,j) = \frac{1}{N} \sum_{x,y} v_k(i) v_k(j) - \frac{1}{N} \sum_{k=1}^{N} v_k(i) \frac{1}{N} \sum_{k=1}^{N} v_k(j) \quad (2)$$

Here, $C_{d \times d}$ of (1) in the equation 4 may mean the covariance matrix having a size of d×d, and COV(i, j) may mean a covariance value in a position of (i,j).

In order to derive the covariance matrix, (2) of the equation 4 may be used. Here, $v_k(i)$ may mean a value of i-direction feature vector, and N may mean the number of feature vectors which mean the number of pixels in the patch image 14.

Here, since the covariance matrix exists in Remannian geometry space, immanent distance between the covariance matrixes should be calculated for matching using distances between feature points.

However, since much computation time is needed for calculating immanent distance between the covariance matrixes, the covariance matrix in Remannian geometry space may be converted into vectors in Euclidean space by using a metric embedding technique so as to derive the covariance descriptor.

An object can be recognized from the input image based on the derived covariance descriptor. Specifically, the matching between the derived covariance descriptor for the object to be recognized and the reference covariance descriptors may be performed as shown in FIG. 6A. Here, the matching may mean a matching between objects existing in different images.

For example, the matching between the derived covariance descriptor and the reference covariance descriptors may be performed by using a k-nearest neighbor distance ratio.

Here, the reference covariance descriptors may be stored in advance by deriving covariance descriptors on the objects from a plurality of reference images in which the object to be recognized is included.

Accordingly, inlier matched pairs may be extracted as shown in FIG. 6B. Here, the inlier matched pair may be estimated based on RANSAC algorithm which estimates a statistical parameter in order to estimate relationship between covariance descriptors.

Here, the inlier matched pair means information on covariance descriptors matched in a procedure of matching covariance descriptors which is performed for recognizing objects existing in different images. However, it is not restricted to the above meaning.

If the number of the inlier matched pairs is greater than a predetermined number, objects existing in different images may be recognized as the same object. Also, the object can be recognized by estimating a homography which can represent a pose of the object based on the inlier matched pairs, as shown in (c) of FIG. 6.

Figure 7:
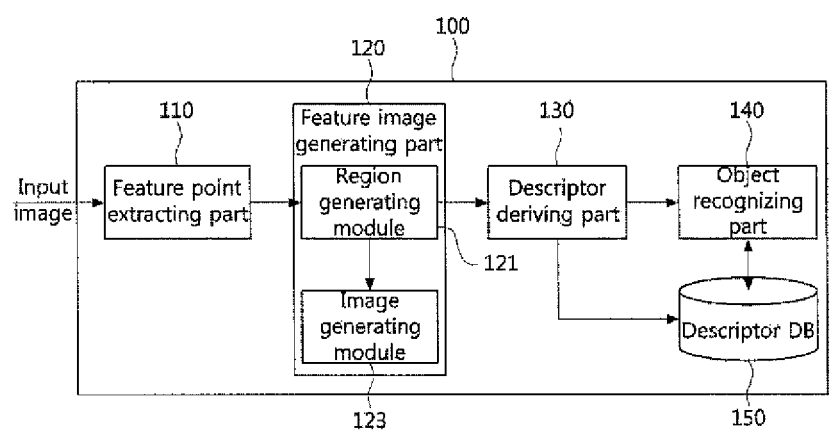
FIG. 7 is a block diagram to illustrate an object recognizing apparatus according to an example embodiment of the present invention.

FIG. 7 is a block diagram to illustrate an object recognizing apparatus according to an example embodiment of the present invention.

Referring to FIG. 7, an object recognizing apparatus 100 may comprise a feature point extracting part 110, a feature image generating part 120, a descriptor deriving part 130, and an object recognizing part 140. Also, the apparatus may further comprise a descriptor data base.

Here, the apparatus 100 may be equipped with a user terminal or may be a user terminal itself. The user terminal may be an information processing apparatus having at least one sensor to which an input image is inputted and a digital signal processing unit for processing the input image, such as a smart phone, a tablet PC, a desktop computer, or a laptop computer. However, the user terminal may not be restricted to a specific device.

Also, the at least one sensor may be an image sensor which can acquire the input image, such as a camera sensor, a depth camera based on Time of Flight, and a Kinnect camera. However, the at least one sensor is not restricted to the above examples.

The feature point extracting part 110 may extract feature points for the at least one object to be recognized from the input image. Specifically, in order to extract feature points about the at least one object, multiple downscaled images 11 can be generated by downscaling the input image into multiple images 11 with a predetermined downscale ratio.

Accordingly, feature points about corners of the at least one object can be extracted by applying a FAST corner detection algorithm based on the FAST algorithm to the multiple images 11. Here, the use of the FAST corner detection algorithm may derive candidates of the corners of the at least one object from the input image, and determine the feature points about the corners of the at least one object fast and stably based on differences between brightness values of the derived candidates of the corners.

Here, the reason of extracting the feature points about corners of the at least one object is that characteristics of the corners of the object do not change according to size of the image, illumination, and rotation of the image.

Here, the FAST corner detection algorithm based of the FAST algorithm is used for extracting the feature points of the corners of the at least one object. However, various detection algorithms or techniques may be used for extracting the feature points of the at least one object in the image without restricting to the FAST corner detection algorithm.

The feature image generating part 120 may derive orientation information of areas adjacent to the extracted feature points and normalize the orientation information thereby generating feature images.

Also, the feature image generating part 120 may comprise a region generating module 121 and an image generating module 123.

The region generating module 121 may generate the feature point regions by deriving the orientation information of the areas adjacent to the feature points about the corners of the at least one object in the input image. Here, the feature point regions may be generated by deriving the orientation information on the basis of intensity or brightness values on surfaces of the object.

The image generating module 123 may generate patch images by sampling values of a plurality of pixels located within the generated feature point regions, normalizing the feature point regions, and generating a plurality of feature images 15 from the patch image.

Here, the patch image 14 may be generated by sampling values of a plurality of pixels located within the generated feature point region and normalizing the feature point region.

For example, the patch image may be generated by sampling orientations of values of multiple pixels located within a feature point region among a plurality of feature point regions generated based on the feature points extracted from the input image and performing normalization on rotational changes of the feature points.

The descriptor deriving part 130 may derive a covariance matrix based on pixels located at the same coordinates of the multiple feature images 15, and derive the covariance descriptor by converting the derived covariance matrix into vectors in Euclidean space.

Here, the derived covariance descriptor may represent relationship between pixel values located within the feature point region 13 of the multiple feature images 15. That is, the relationship between pixel values located within the feature point region may be represented by including at least one of direction, color, and brightness of the corners of the object in the input image.

Since the covariance matrix exists in Remannian geometry space, an immanent distance between the covariance matrixes should be calculated for matching using distances between feature points.

However, since much computation time is needed for calculating immanent distance between the covariance matrixes, the covariance matrix in Remannian geometry space may be converted into vectors in Euclidean space by using a metric embedding technique so as to derive the covariance descriptor.

The derived covariance descriptor may be recorded in the descriptor data base 150 as a reference covariance descriptor for a later use.

The object recognizing part 140 may recognize the object in the input image by comparing the derived covariance descriptor with a pre-recorded reference covariance descriptor for the object.

Here, the reference covariance descriptor may be recorded in the descriptor data base 150 by deriving a covariance descriptor on the object from a plurality of reference images in which the object to be recognized is included.

Specifically, the object can be recognized from the input image by deriving inlier matched pair based on comparison between the covariance descriptor on the object to be recognized and a reference covariance descriptor stored in advance and estimating homography of the object to be recognized based on the inlier matched pair.

For example, the matching between the derived covariance descriptor and the reference covariance descriptor may be performed by using a k-nearest neighbor distance ratio. Here, the matching may mean a matching between objects existing in different images.

That is, the inlier matched pair may be estimated based on Ransac algorithm which estimates a statistical parameter in order to estimate relationship between covariance descriptors.

Here, the inlier matched pair means information on covariance descriptors matched in a procedure of matching covariance descriptors which is performed for recognizing objects existing in different images. However, it is not restricted to the above meaning.

At this time, if the number of the inlier matched pairs is greater than a predetermined number, objects existing in different images may be recognized as the same object. Also, the object can be recognized by estimating a homography which can represent a pose of the object based on the inlier matched pairs.

According to the object recognizing apparatus and method according to the present invention, the object may be recognized from the input image fast and robustly to changes on the size of the input image, rotations of the input image, and illumination by extracting feature points of corners of the object.

Also, the recognition performance may be enhanced by deriving a covariance descriptor from a covariance matrix based on orientation information about a region adjacent to the extracted feature point.

While the example embodiments of the present invention and their advantages have been described in detail, it should be understood that various changes, substitutions and alterations may be made herein without departing from the scope of the invention.

What is claimed is:

1. A method for recognizing objects, performed in an information processing apparatus which can perform digital signal processing, the method comprising:
    extracting a feature point of an object to be recognized in an input image;
    generating a plurality of feature images by extracting orientation information of a region adjacent to the feature point and normalizing the region based on the orientation information;
    deriving a covariance descriptor based on the plurality of feature images; and
    recognizing the object in the input image by comparing the covariance descriptor with at least one reference covariance descriptor stored in advance,
    wherein extracting the feature point of the object to be recognized includes:
    downscaling the input image into multiple downscaled images; and
    extracting the feature point in corners of the object in the multiple downscaled images, and
    wherein generating the plurality of feature images includes:
    generating a feature point region by deriving orientation information of the region adjacent to the feature point;
    generating a patch image by sampling values of pixels located within the feature point region and normalizing the feature point region; and
    generating the plurality of feature images based on the patch image.

2. The method of claim 1, wherein deriving the covariance descriptor includes:
    deriving a covariance matrix based on pixels located at same coordinate in the plurality of feature images; and
    converting the covariance matrix into the covariance descriptor which is a vector in Euclidean space.

3. The method of claim 2, wherein the covariance matrix represents relationship between the pixels located at same coordinate in the plurality of feature images about characteristic including at least one of orientation of the object, color of the object, and brightness of the object.

4. The method of claim 1, wherein recognizing the object in the input image includes:
    deriving an inlier matched pair by comparing the covariance descriptor with at least one reference covariance descriptor stored in advance; and
    recognizing the object in the input image by estimating a homography of the object based on the inlier matched pair.

5. The method of claim 1, wherein the at least one reference covariance descriptor is derived from a plurality of reference images including the object, and stored in advance.

6. An apparatus for recognizing objects from an input image, which is equipped in an information processing apparatus capable of performing digital signal processing, the information processing apparatus comprising a digital signal processing (DSP) unit and a memory which is connected to the DSP unit, the apparatus performing modules stored in the memory, the modules comprising:

a feature point extracting part extracting a feature point of an object to be recognized in an input image;

a feature image generating part generating a plurality of feature images by extracting orientation information of a region adjacent to the feature point and normalizing the region based on the orientation information;

a descriptor deriving part deriving a covariance descriptor based on the feature images; and an object recognizing part recognizing the object in the input image by comparing the covariance descriptor with a reference covariance descriptor stored in advance, wherein the feature point extracting part downscales the input image into multiple downscaled images and extracts the feature point in corners of the object in the multiple downscaled images, and wherein the feature image generating part includes:

a region generating module generating a feature point region by deriving orientation information of the region adjacent to the feature point; and an image generating module generating a patch image by sampling values of pixels located within the feature point region and normalizing the feature point region and generating the plurality of feature images based on the patch image.

7. The apparatus of claim 6, wherein the descriptor deriving part generates the covariance descriptor by deriving a covariance matrix based on pixels located at same coordinate in the plurality of feature images and converting the covariance matrix into a vector in Euclidean space.

8. The apparatus of claim 7, wherein the covariance matrix represents relationship between the pixels located at same coordinate in the plurality of feature images about characteristic including at least one of orientation of the object, color of the object, and brightness of the object.

9. The apparatus of claim 6, wherein the object recognizing part derives an inlier matched pair by comparing the covariance descriptor with at least one reference covariance descriptor stored in advance, and recognizes the object in the input image by estimating a homography of the object based on the inlier matched pair.

10. The apparatus of claim 6, further comprising a descriptor data base storing the at least one reference covariance descriptor derived from a plurality of reference images including the object.

* * * * *